US012331552B2

(12) United States Patent
Heblikar et al.

(10) Patent No.: US 12,331,552 B2
(45) **Date of Patent: *Jun. 17, 2025**

(54) LOCK MODULE WITH MECHANICAL OVERRIDE

(71) Applicant: Schlage Lock Company LLC, Carmel, IN (US)

(72) Inventors: Aditya Heblikar, Ballari (IN); Nagesh Varadaraju, Bangalore (IN); Saagar Mohammed, Alappuzha (IN)

(73) Assignee: Schlage Lock Company LLC, Carmel, IN (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/675,737

(22) Filed: May 28, 2024

(65) Prior Publication Data

US 2024/0309679 A1 Sep. 19, 2024

Related U.S. Application Data

(63) Continuation of application No. 17/531,087, filed on Nov. 19, 2021, now Pat. No. 11,993,955.

(51) Int. Cl.
*E05B 63/00* (2006.01)
*E05B 9/00* (2006.01)
(Continued)

(52) U.S. Cl.
CPC .......... *E05B 63/0069* (2013.01); *E05B 9/002* (2013.01); *E05B 9/084* (2013.01);
(Continued)

(58) Field of Classification Search
CPC ...... E05B 63/0069; E05B 9/002; E05B 9/084; E05B 13/002; E05B 2047/0026;
(Continued)

(56) References Cited

U.S. PATENT DOCUMENTS 4,073,527 A 2/1978 Schlage
5,474,348 A 12/1995 Palmer et al.
(Continued)

FOREIGN PATENT DOCUMENTS

CN 102041921 A 5/2011
CN 205314684 U 6/2016
(Continued)

OTHER PUBLICATIONS

Chinese Office Action; National Intellectual Property Administration, People's Republic of China; Chinese Patent Application No. 201980062840.1; Sep. 15, 2021; 8 pages.
(Continued)

*Primary Examiner* — Kristina R Fulton
*Assistant Examiner* — Christopher F Callahan
(74) *Attorney, Agent, or Firm* — Taft Stettinius & Hollister LLP

(57) ABSTRACT

An exemplary apparatus includes a housing, a lock mechanism mounted to the housing, an electromechanical driver, a first override mechanism, and a second override mechanism. The electromechanical driver is mounted to the housing and is operable to unlock the lock mechanism. The first override mechanism is movably mounted to the housing and is operable to unlock the lock mechanism. The second override mechanism is movably mounted to the housing and is operable to unlock the lock mechanism. The apparatus has a first configuration in which a lock cylinder is engaged with the first override mechanism such that actuation of the lock cylinder unlocks the lock mechanism. The apparatus has a second configuration in which the lock cylinder is engaged with the second override mechanism such that actuation of the lock cylinder unlocks the lock mechanism.

20 Claims, 11 Drawing Sheets

(51) Int. Cl.
*E05B 9/08* (2006.01)
*E05B 13/00* (2006.01)
*E05B 47/00* (2006.01)

(52) U.S. Cl.
CPC ........ *E05B 13/002* (2013.01); *E05B 47/0012* (2013.01); *E05B 2047/0017* (2013.01); *E05B 2047/002* (2013.01)

(58) Field of Classification Search
CPC ..... E05B 2047/0028; E05B 2047/0084; E05B 2047/0085; E05B 2047/0086; E05B 2047/0088; E05B 47/0012; E05B 47/0657; E05B 47/0665; E05B 47/0673; E05C 21/00
See application file for complete search history.

(56) References Cited

U.S. PATENT DOCUMENTS

| | | | | |
|---|---|---|---|---|
| 5,628,216 | A | 5/1997 | Qureshi et al. | |
| 5,884,515 | A | 3/1999 | Milman | |
| 6,354,121 | B1 | 3/2002 | Frolov | |
| 6,487,884 | B1 | 12/2002 | Constantinou | |
| 7,007,526 | B2 | 3/2006 | Frolov et al. | |
| 7,069,755 | B2 | 7/2006 | Lies et al. | |
| 7,096,698 | B2 * | 8/2006 | Walsh, III | E05B 47/0012 70/277 |
| 7,168,276 | B2 * | 1/2007 | Errani | E05B 47/0692 70/222 |
| 9,217,264 | B2 | 12/2015 | Milton-Benoit et al. | |
| 9,670,696 | B2 | 6/2017 | Chong | |
| 9,803,394 | B2 | 10/2017 | Frolov et al. | |
| 10,738,506 | B2 | 8/2020 | Holmes et al. | |
| 2002/0144526 | A1 | 10/2002 | Ming Chih | |
| 2004/0129044 | A1 | 7/2004 | DiVito | |
| 2005/0144994 | A1 | 7/2005 | Lies et al. | |
| 2005/0172685 | A1 | 8/2005 | Keightly | |
| 2005/0284200 | A1 | 12/2005 | Moon et al. | |
| 2006/0112747 | A1 | 6/2006 | Moon et al. | |
| 2007/0157684 | A1 * | 7/2007 | Bogdanov | E05B 47/0692 70/279.1 |
| 2009/0025438 | A1 | 1/2009 | Don et al. | |
| 2009/0027197 | A1 | 1/2009 | Frolov | |
| 2010/0011822 | A1 | 1/2010 | Ocana | |
| 2010/0031713 | A1 | 2/2010 | Brown et al. | |
| 2010/0212373 | A1 | 8/2010 | Wheeler | |
| 2010/0263418 | A1 | 10/2010 | Moon et al. | |
| 2012/0013135 | A1 | 1/2012 | Moon et al. | |
| 2012/0267903 | A1 | 10/2012 | Welsby et al. | |
| 2013/0192318 | A1 | 8/2013 | Yanar et al. | |
| 2016/0258189 | A1 | 9/2016 | Frolov | |
| 2017/0016252 | A1 | 1/2017 | Uhlmann | |
| 2017/0122007 | A1 | 5/2017 | Moon et al. | |
| 2017/0342740 | A1 | 11/2017 | Basavaraju et al. | |
| 2018/0298642 | A1 * | 10/2018 | Tagtow | E05B 47/026 |
| 2020/0032551 | A1 * | 1/2020 | Holmes | E05B 47/0012 |
| 2020/0370338 | A1 | 11/2020 | Holmes et al. | |

FOREIGN PATENT DOCUMENTS

| | | | | |
|---|---|---|---|---|
| CN | 106320815 | A | | 1/2017 |
| DE | 202008005166 | U1 | | 5/2009 |
| EP | 1953312 | B1 | | 9/2013 |
| KR | 2009120132 | A | * | 11/2009 |
| KR | 20090120132 | A | | 11/2009 |
| WO | 2010130850 | A1 | | 11/2011 |

OTHER PUBLICATIONS

International Search Report; International Searching Authority; International Application No. PCT/US2019/043263; Nov. 4, 2019; 2 pages.
Written Opinion of the International Searching Authority; International Searching Authority; International Application No. PCT/US2019/043263; Nov. 4, 2019; 5 pages.
International Search Report; International Searching Authority; International Application No. PCT/US2022/050415; Feb. 16, 2023; 2 pages.
Written Opinion of the International Searching Authority; International Searching Authority; International Application No. PCT/US2022/050415; Feb. 16, 2023; 4 pages.
Extended European Search Report; European Patent Office; European Patent Application No. 22896527.3; Mar. 3, 2025; 6 pages.
Australian Examination Report; Australian Patent Office; Australian Patent Application No. 2022395006; Apr. 9, 2025; 3 pages.
Canadian Examination Report; Canadian Intellectual Property Office; Canadian Patent Application No. 3,238,647; Apr. 24, 2025; 3 pages.

* cited by examiner

LOCK MODULE WITH MECHANICAL OVERRIDE

CROSS-REFERENCE TO RELATED APPLICATIONS

The present application is a continuation of U.S. patent application Ser. No. 17/531,087 filed Nov. 19, 2021 and issued as U.S. Pat. No. 11,993,955, the contents of which are hereby incorporated by reference in their entirety.

TECHNICAL FIELD

The present disclosure generally relates to access control assemblies, and more particularly but not exclusively relates to modular access control assemblies with mechanical override features.

BACKGROUND

Electronic locks are often installed to doors to facilitate electronic locking and unlocking of the door. However, certain existing electronic locks suffer from certain drawbacks and disadvantages, such as those related to unlocking during a power failure condition. For these reasons among others, there remains a need for further improvements in this technological field.

SUMMARY

An exemplary apparatus includes a housing, a lock mechanism mounted to the housing, an electromechanical driver, a first override mechanism, and a second override mechanism. The electromechanical driver is mounted to the housing and is operable to unlock the lock mechanism. The first override mechanism is movably mounted to the housing and is operable to unlock the lock mechanism. The second override mechanism is movably mounted to the housing and is operable to unlock the lock mechanism. The apparatus has a first configuration in which a lock cylinder is engaged with the first override mechanism such that actuation of the lock cylinder unlocks the lock mechanism. The apparatus has a second configuration in which the lock cylinder is engaged with the second override mechanism such that actuation of the lock cylinder unlocks the lock mechanism. Further embodiments, forms, features, and aspects of the present application shall become apparent from the description and figures provided herewith.

DETAILED DESCRIPTION OF ILLUSTRATIVE EMBODIMENTS

Figure 1:
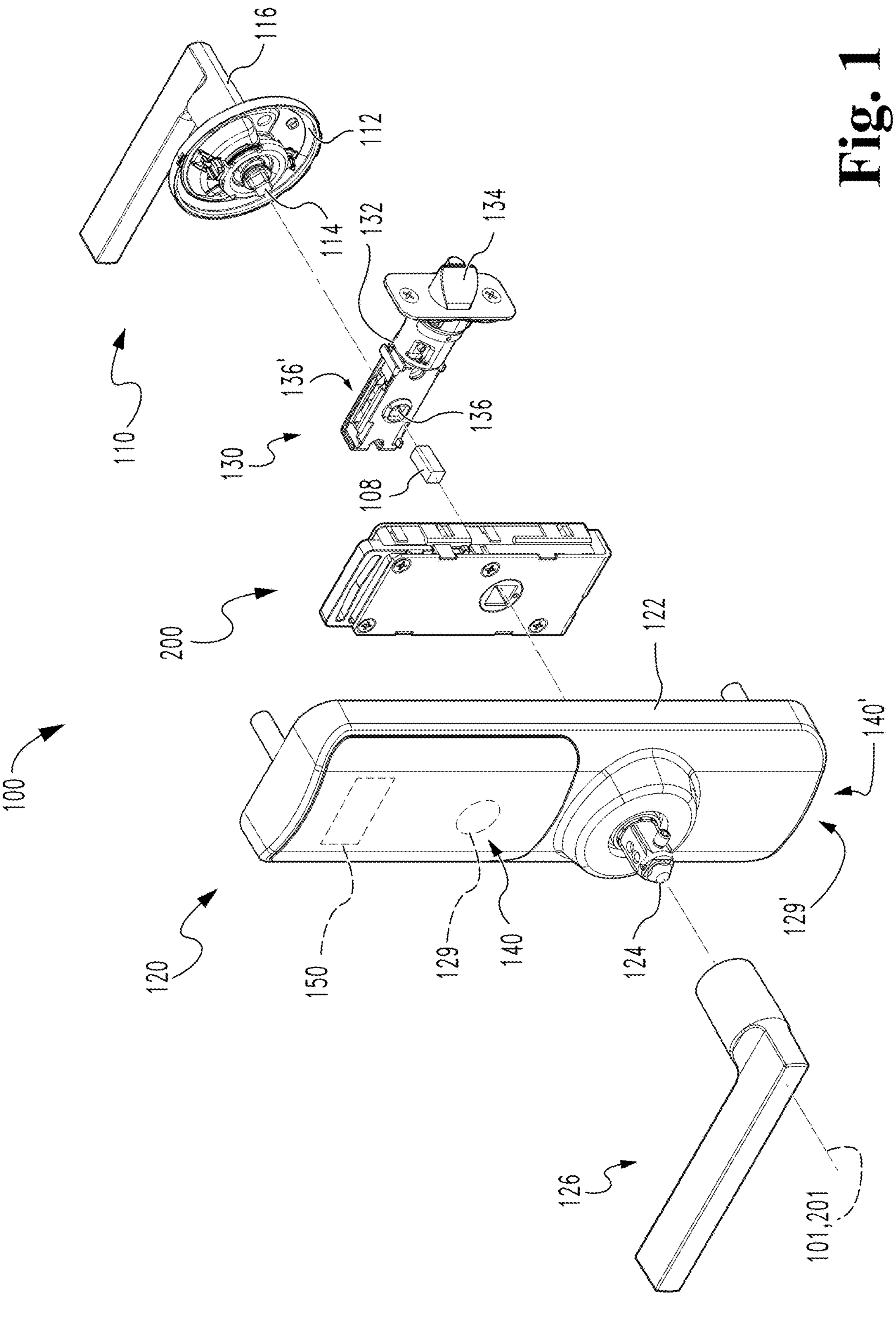
FIG. 1 is an exploded assembly view of a lockset according to certain embodiments.
Figure 2:
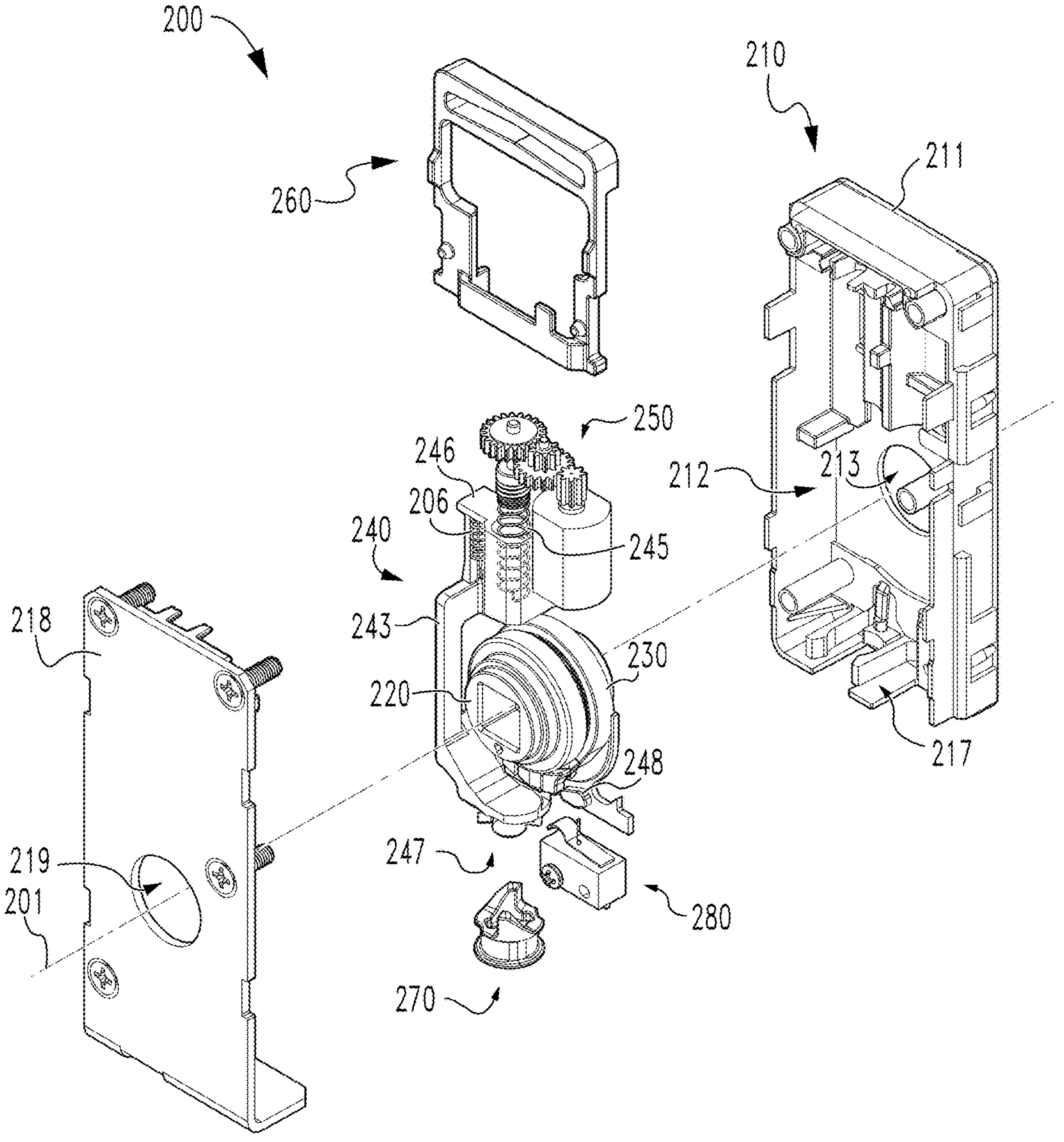
FIG. 2 is an exploded assembly view of a lock module according to certain embodiments.
Figure 3:
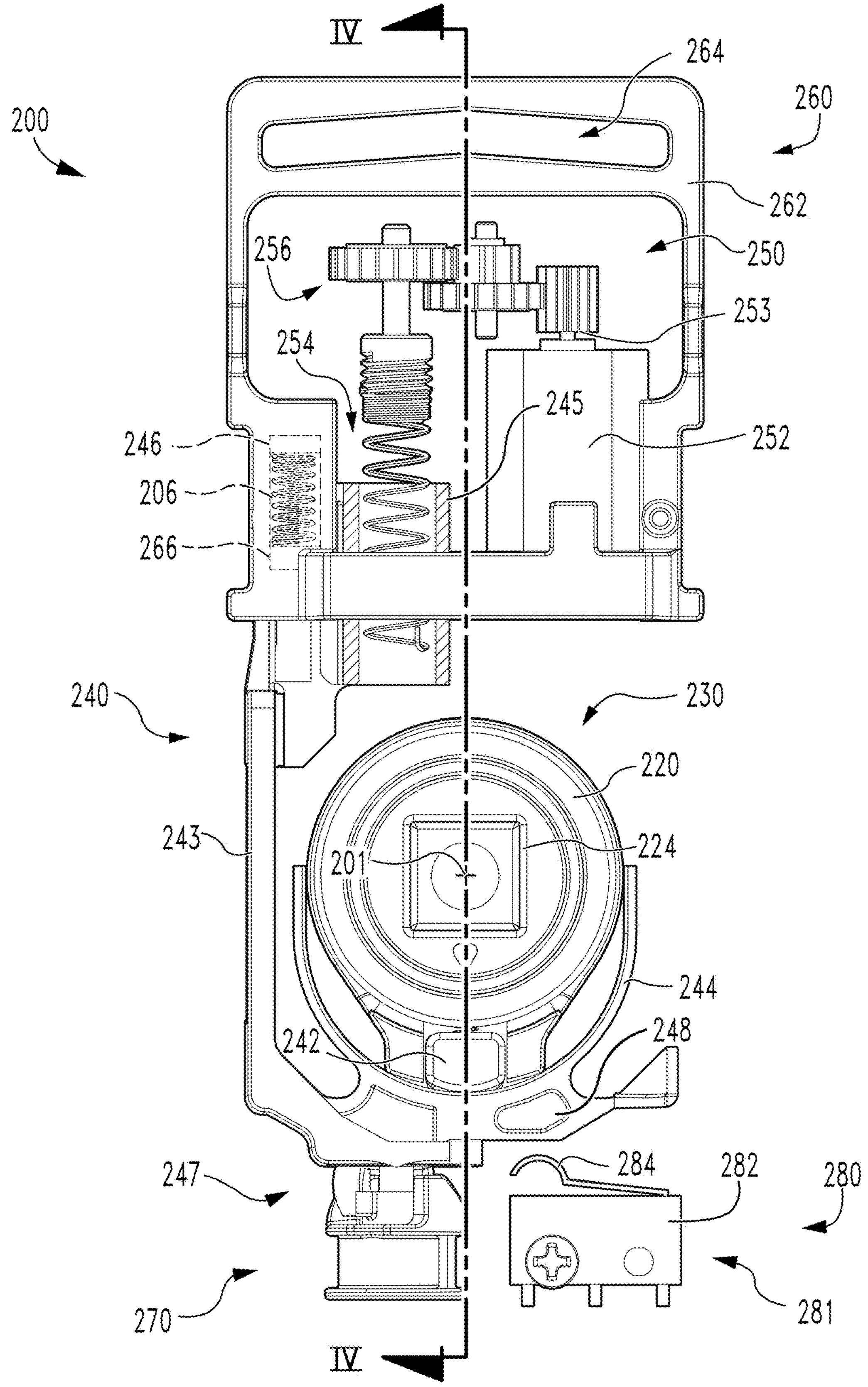
FIG. 3 is a plan view of a portion of the lock module with the lock module in a locked state.
Figure 5:
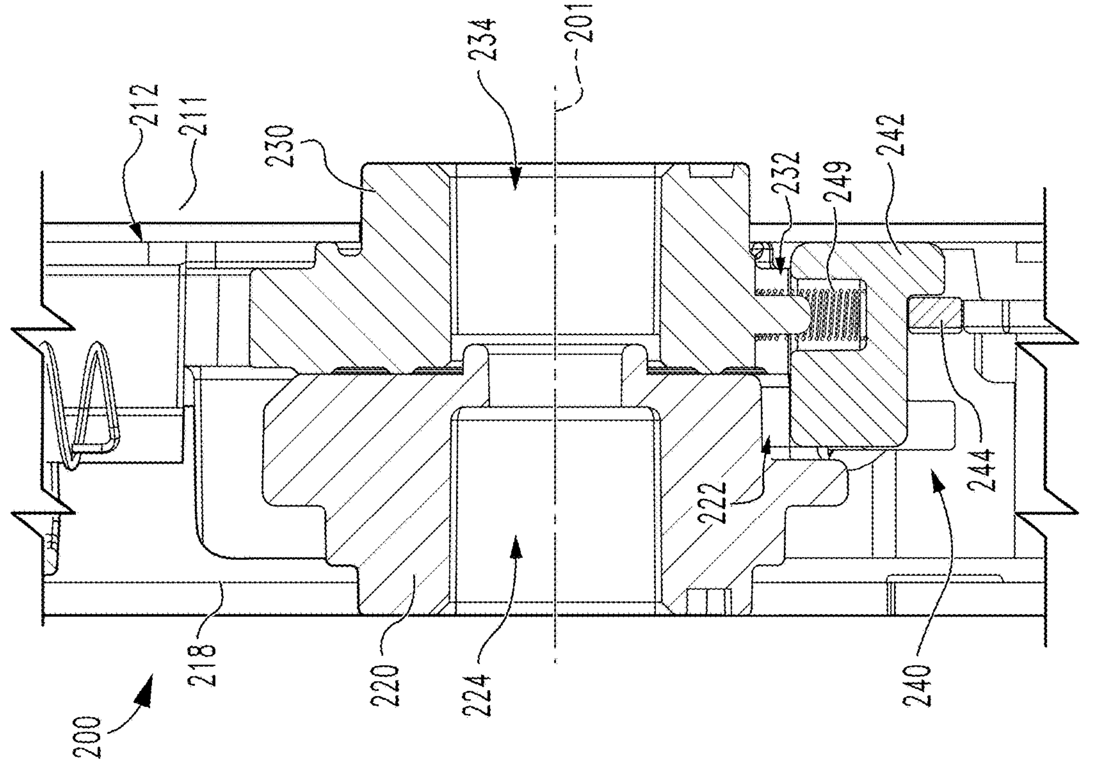
FIG. 5 is a cross-sectional illustration of the lock module in an unlocked state, and is taken along the line IV-IV illustrated in FIG. 3.
Figure 4:
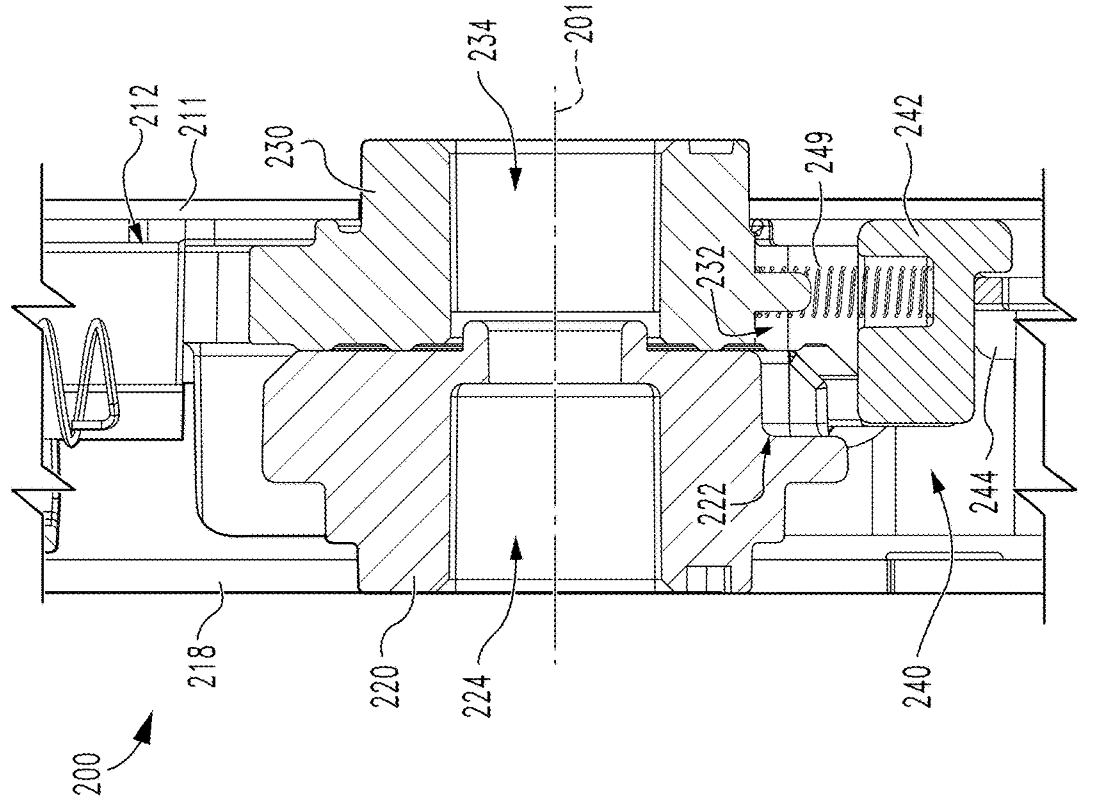
FIG. 4 is a cross-sectional illustration of the lock module in the locked state, and is taken along the line IV-IV illustrated in FIG. 3.

Although the concepts of the present disclosure are susceptible to various modifications and alternative forms, specific embodiments have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. It should further be appreciated that although reference to a "preferred" component or feature may indicate the desirability of a particular component or feature with respect to an embodiment, the disclosure is not so limiting with respect to other embodiments, which may omit such a component or feature. Further, when a particular feature, structure, or characteristic is described in connection with an embodiment, it is submitted that it is within the knowledge of one skilled in the art to implement such feature, structure, or characteristic in connection with other embodiments whether or not explicitly described.

As used herein, the terms "longitudinal," "lateral," and "transverse" may be used to denote motion or spacing along three mutually perpendicular axes, wherein each of the axes defines two opposite directions. These terms are used for ease and convenience of description, and are without regard to the orientation of the system with respect to the environment. For example, descriptions that reference a longitudinal direction may be equally applicable to a vertical direction, a horizontal direction, or an off-axis orientation with respect to the environment.

Furthermore, motion or spacing along a direction defined by one of the axes need not preclude motion or spacing along a direction defined by another of the axes. For example, elements that are described as being "laterally offset" from one another may also be offset in the longitudinal and/or transverse directions, or may be aligned in the longitudinal and/or transverse directions. Moreover, the term "transverse" may also be used to describe motion or spacing that is non-parallel to a particular axis or direction. For example, an element that is described as being "movable in a direction transverse to the longitudinal axis" may move in a direction that is perpendicular to the longitudinal axis and/or in a direction oblique to the longitudinal axis. The terms are therefore not to be construed as limiting the scope of the subject matter described herein to any particular arrangement unless specified to the contrary.

Additionally, it should be appreciated that items included in a list in the form of "at least one of A, B, and C" can mean (A); (B); (C); (A and B); (B and C); (A and C); or (A, B, and C). Similarly, items listed in the form of "at least one of A, B, or C" can mean (A); (B); (C); (A and B); (B and C); (A and C); or (A, B, and C). Items listed in the form of "A, B, and/or C" can also mean (A); (B); (C); (A and B); (B and C); (A and C); or (A, B, and C). Further, with respect to the claims, the use of words and phrases such as "a," "an," "at least one," and/or "at least one portion" should not be interpreted so as to be limiting to only one such element unless specifically stated to the contrary, and the use of phrases such as "at least a portion" and/or "a portion" should be interpreted as encompassing both embodiments including only a portion of such element and embodiments including the entirety of such element unless specifically stated to the contrary.

In the drawings, some structural or method features may be shown in certain specific arrangements and/or orderings. However, it should be appreciated that such specific arrangements and/or orderings may not necessarily be required. Rather, in some embodiments, such features may be arranged in a different manner and/or order than shown in the illustrative figures unless indicated to the contrary. Additionally, the inclusion of a structural or method feature in a particular figure is not meant to imply that such feature is required in all embodiments and, in some embodiments, may be omitted or may be combined with other features.

The disclosed embodiments may, in some cases, be implemented in hardware, firmware, software, or a combination thereof. The disclosed embodiments may also be implemented as instructions carried by or stored on one or more transitory or non-transitory machine-readable (e.g., computer-readable) storage media, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

With reference to FIG. 1, illustrated therein is a lockset 100 according to certain embodiments. The lockset 100 generally includes an inside trim assembly 110 configured for mounting to an interior or egress side of a door, an outside trim assembly 120 configured for mounting to an exterior or non-egress side of the door, and a latch mechanism 130 connected with each of the inside trim assembly 110 and the outside trim assembly 120, and in the illustrated form, further includes a latch spindle 108 connected between the outside trim assembly 120 and the latch mechanism 130.

The inside trim assembly 110 generally includes an inside housing 112, an inside spindle 114 rotatably mounted to the housing 112 for rotation about a longitudinal rotational axis 101 of the lockset 100, and an inside handle 116 mounted to the spindle 114. As described herein, the inside spindle 114 is engaged with the latch mechanism 130 such that the inside handle 116 is operable to actuate the latch mechanism 130. In the illustrated form, the inside handle 116 is provided in the form of a lever. It is also contemplated that the inside handle 116 may be provided in another form, such as that of a knob.

The outside trim assembly 120 generally includes an escutcheon 122, an outside spindle 124 rotatably mounted to the escutcheon 122 for rotation about the longitudinal axis 101, an outside handle 126 mounted to the spindle 124, and a lock module 200 according to certain embodiments. As described herein, the illustrated lock module 200 selectively permits the outside spindle 124 to rotate the latch spindle 108 for actuation of the latch mechanism 130 by the outside handle 126. In the illustrated form, the outside handle 126 is provided in the form of a lever. It is also contemplated that the outside handle 126 may be provided in another form, such as that of a knob.

As described herein, the outside trim assembly 120 also includes a lock cylinder 140, and may further include a control assembly 150. Additionally or alternatively, at least a portion of the control assembly 150 may be positioned elsewhere, such as within the inside trim assembly 110 and/or at a location remote from the lockset 100. In certain embodiments, the escutcheon 122 includes a first mounting location 129, and the lock cylinder 140 is mounted to the first mounting location. Additionally or alternatively, the escutcheon 122 may include an alternative or second mounting location 129', and a lock cylinder 140' may be mounted to the second mounting location 129'.

The latch mechanism 130 generally includes a housing 132, a latchbolt 134 mounted for movement relative to the housing 132 between an extended position and a retracted position, and at least one retractor operable to retract the latchbolt 134. In the illustrated form, the latch mechanism 130 includes an outside retractor 136 and an inside retractor 136'. The outside retractor 136 is configured to engage the latch spindle 108 such that rotation of the latch spindle 108 causes retraction of the latchbolt 134. Similarly, the inside retractor 136' is configured to engage the inside spindle 114 such that rotation of the inside spindle 114 causes retraction of the latchbolt 134.

In the illustrated embodiment, the latch spindle 108 and the inside spindle 114 are separate and discrete components, and are accordingly rotatable relative to one another. It is also contemplated that the latch spindle 108 and the inside spindle 114 may be integrated into a single extended spindle that extends through the latch mechanism 130 and into engagement with the lock module 200 and the inside handle 116. In at least these forms, the latch mechanism 130 may include a single retractor 136.

With additional reference to FIGS. 2-5, the lock module 200 generally includes a housing 210, a first hub 220 rotatably mounted in the housing 210, a second hub 230 rotatably mounted in the housing 210, a clutch mechanism 240 operable to selectively rotationally couple the first hub 220 and the second hub 230, an electromechanical drive assembly 250 operable to move the clutch mechanism 240 between a decoupling or locked state and a coupling or unlocked state, a first override mechanism 260 operable to move the clutch mechanism 240 to the unlocked state, and a second override mechanism 270 operable to move the clutch mechanism 240 to the unlocked state. In certain forms, the lock module 200 may further include a lock status sensor 280 operable to detect the locked/unlocked state of the clutch mechanism 240, and thus the locked/unlocked condition of the lock module 200.

The housing 210 generally includes a case 211 defining a chamber 212, and a cover 218 configured for coupling with the case 211 to at least partially enclose various components of the lock module 200 within the chamber 212. The cover 218 defines a first opening 219 that rotatably supports the first hub 220, and the case 211 defines a second opening 213 that rotatably supports the second hub 230.

The first hub 220 is rotatably supported by the housing 210 for rotation about a longitudinal rotational axis 201 between a first hub home position and a first hub rotated position, and generally includes a first notch 222 and a first spindle engagement feature 224. In the illustrated form, the spindle engagement feature 224 is provided in the form of a square opening configured to engage a square portion of the outside spindle 124. It is also contemplated that other geometries may be utilized. As one example, the opening may have a different cross-sectional geometry. As another example, the hub 220 may instead include a boss configured to be received in an opening formed in the end of the outside spindle 124.

The second hub 230 is rotatably supported by the housing 210 for rotation about the longitudinal rotational axis 201 between a second hub home position and a second hub rotated position, and generally includes a second notch 232 and a second spindle engagement feature 234. In the illustrated form, the spindle engagement feature 234 is provided in the form of a square opening configured to engage a square portion of the latch spindle 108. It is also contemplated that other geometries may be utilized. As one example, the opening may have a different cross-sectional geometry. As another example, the hub 230 may instead include a boss configured to be received in an opening formed in the end of the latch spindle 108, or may directly engaged the outside retractor 136.

In the illustrated configuration of the outside trim assembly 120, the first hub 220 is rotationally coupled with the outside spindle 124, and the second hub 230 is rotationally coupled with the latch spindle 108. It is also contemplated that this orientation may be reversed, such that the first hub 220 is rotationally coupled with the latch spindle 108, and the second hub 230 is rotationally coupled with the outside spindle 124. Moreover, in certain embodiments, the lock module 200 may be reversible such that each of the hubs 220, 230 is operable to engage each of the spindles 124, 108.

The clutch mechanism 240 generally includes a coupler 242 having a coupling position and a decoupling position, a movable wall 243 operable to move the coupler 242 between the coupling position and the decoupling position, and a bias member 249 biasing the coupler 242 toward its decoupling position. In the illustrated form, the bias member 249 is provided in the form of a compression spring. It is also contemplated that the bias member 249 may be provided in another form, such as one including a torsion spring, an extension spring, a leaf spring, and/or one or more magnets.

The movable wall 243 has a locking position (FIG. 4) in which the movable wall 243 permits the bias member 249 to retain the coupler 242 in its decoupling position, and an unlocking position (FIG. 5) in which the movable wall 243 retains the coupler 242 in its coupling position against the urging of the bias member 249. The movable wall 243 includes an arcuate portion 244 that maintains the coupler 242 in its coupling position as the coupled hubs 220, 230 cause the coupler 242 to orbit about the rotational axis 201 in response to rotation of the outside handle 136 when the lock module 200 is unlocked. The movable wall 243 also includes an engagement portion 245 engaged with a spring 259 of the electromechanical drive assembly 250, a ledge 246 engaged with the first override mechanism 260 via a bias member 206, a cam interface 247 through which the wall 243 is engaged with the second override mechanism 270, and a projection 248 operable to actuate the lock status sensor 280.

When the clutch mechanism 240 is in its decoupling or locked state (FIG. 4), the movable wall 243 is in its locking position, and the coupler 242 is in its decoupling position. In the decoupling position, the coupler 242 is removed from at least one of the notches 222, 232 such that the first hub 220 is rotationally decoupled from the second hub 230. As a result, any rotation of the outside spindle 124 is not transmitted to the latch spindle 108, and the outside handle 126 is unable to actuate the latch mechanism 130. This defines a locked condition of the lock module 200, in which the lock module 200 does not permit the outside spindle 124 to rotate the latch spindle 108 for actuation of the latch mechanism 130.

When the clutch mechanism 240 is in its coupling or unlocked state (FIG. 5), the movable wall 243 is in its unlocking position, and the coupler 242 is in its coupling position. In the coupling position, the coupler 242 is partially received in the first notch 222 and is partially received in the second notch 232 such that the coupler 242 extends between the notches 222, 232. As a result, the coupler 242 rotationally couples the hubs 220, 230 such that the outside handle 126 is operable to actuate the latch mechanism 130. This defines an unlocked condition of the lock module 200, in which the lock module 200 rotationally couples the outside spindle 124 with the latch spindle 108.

In the illustrated form, the lock mechanism of the lock module 200 is provided in the form of a clutch mechanism 240, which selectively permits the outside spindle 124 to rotate the latch spindle 108 by selectively coupling the first hub 220 with the second hub 230. It is also contemplated that the lock module 200 may selectively permit the outside spindle 124 to rotate the latch spindle 108 in another manner. For example, the hubs 220, 230 may be at all times rotationally coupled, and a lock mechanism according to certain embodiments may selectively prevent rotation of the coupled hubs 220, 230 to thereby selectively prevent the outside spindle 124 from rotating the latch spindle 108.

As should be evident from the foregoing, the locked/unlocked state of the lock module 200 corresponds to the coupling/decoupling state of the clutch mechanism 240. Additionally, the coupling/decoupling state (or the locking/unlocking state) of the clutch mechanism 240 corresponds to the coupling/decoupling position of the coupler 242, which in turn depends upon the locking/unlocking position of the movable wall 243. Thus, the lock module 400 can be moved between its locked state and its unlocked state by moving the movable wall 243 between its locking position and its unlocking position. As described herein, each of the electromechanical drive assembly 250, the first override mechanism 260, and the second override mechanism 270 is operable to move the wall 243 to its unlocked position such that the lock module 200 can be unlocked by each and any of the electromechanical drive assembly 250, the first override mechanism 260, and the second override mechanism 270.

The electromechanical drive assembly 250 is operable to transition the lock module 200 between its locked state and its unlocked state in response to a lock/unlock signal, and includes an electrically-operable driver. In the illustrated form, the electrically-operable driver is provided in the form of an electromechanical driver, and more particularly is provided in the form of a rotary motor 252. The motor 252 includes an output shaft 253 that is operable to rotate a spring 254 via a gear train 256 to thereby move the wall 243 between its locked position and its unlocked position. It is also contemplated that the electrically-operable driver may take another form operable to move the wall 243 between its locked position and its unlocked position. For example, the driver 252 may be provided in the form of a linear motor, a linear solenoid, a rotary solenoid, or an electromagnet.

In the illustrated embodiment, the spring 254 is provided as a coil spring, and the engagement portion 245 of the wall 243 is positioned between adjacent coils of the spring 254. As a result, rotation of the spring 254 in a locking direction urges the wall 243 toward its locking position, and rotation of the spring 254 in an unlocking direction opposite the locking direction urges the wall 243 toward its unlocking position. Such rotation of the spring 254 in opposite directions may be effected by causing the motor 252 to rotate the shaft 253 in opposite directions. In response to receiving a lock signal, the motor 252 may rotate the motor shaft 253 in a first direction to thereby rotate the spring 254 in its locking direction, thereby urging the wall 243 toward its locking position. In response to receiving an unlock signal, the motor 252 may rotate the motor shaft 253 in a second direction opposite the first direction to thereby rotate the spring 254 in its unlocking direction, thereby urging the wall 243 toward its unlocking position. In the illustrated form, the lock/unlock signal is transmitted by a control assembly external to the lock module 200, such as a control assembly 150 mounted in the escutcheon 122, a control assembly of the inside trim assembly 110, and/or a remote control assembly. In other embodiments, the lock/unlock signal may be transmitted by a control assembly internal to the lock module 200.

Figure 7:
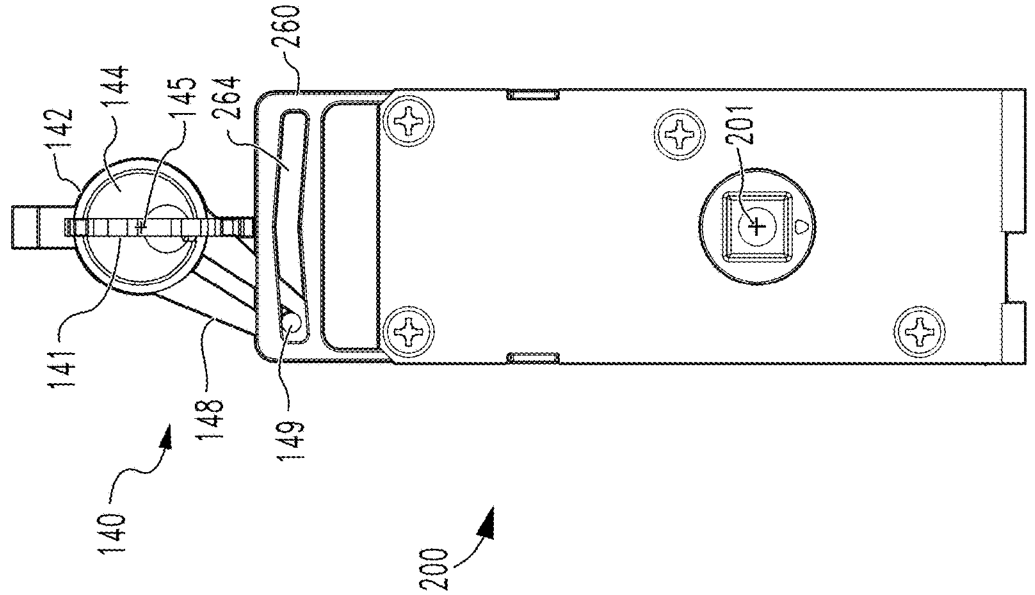
FIG. 7 is a plan view of the lock module in the first configuration with the first override mechanism in an unlocking state.
Figure 6:
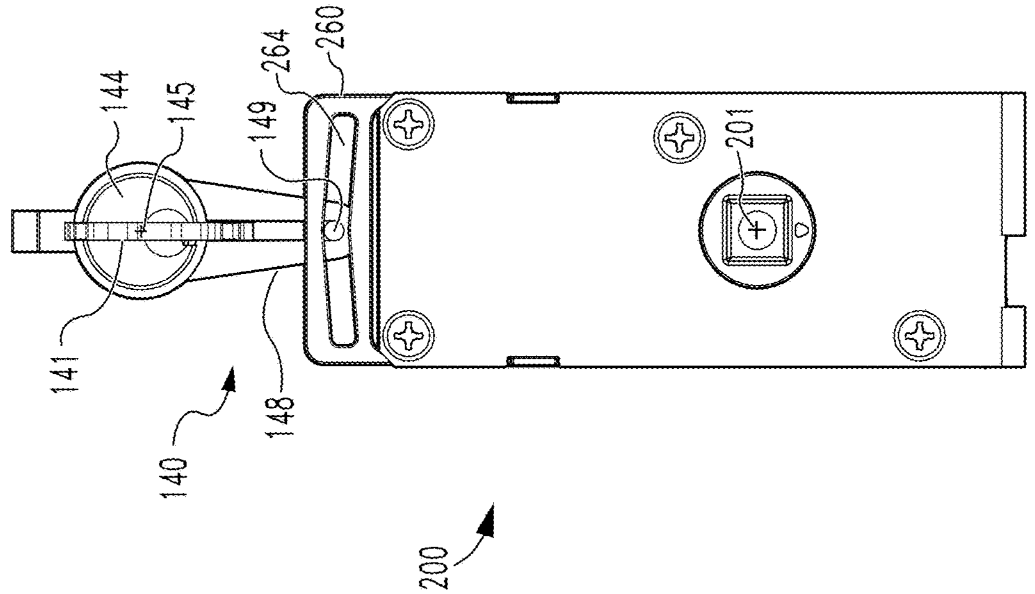
FIG. 6 is a plan view of the lock module in a first configuration with a first override mechanism in a non-unlocking state.
Figure 9:
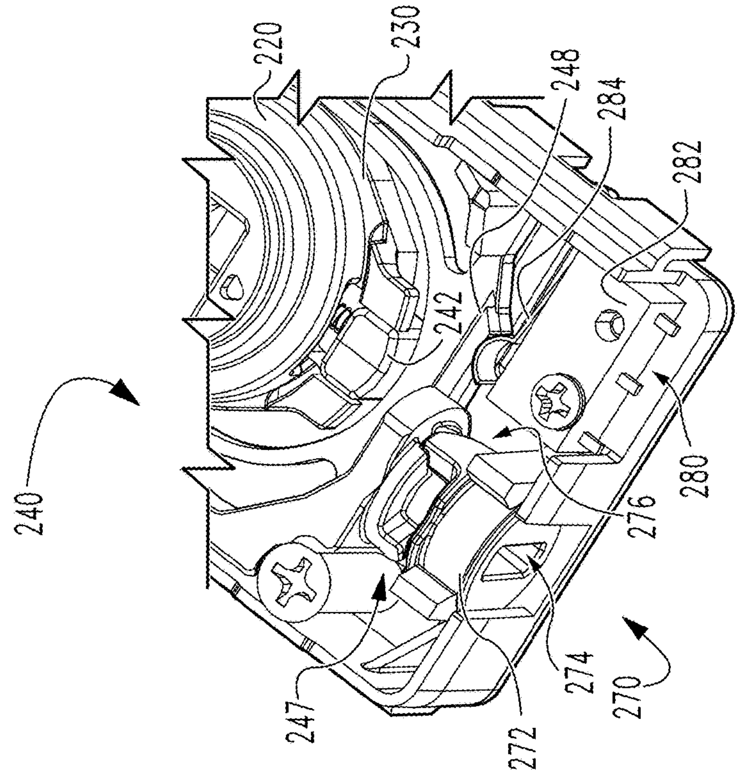
FIG. 9 is a perspective view of the lock module in the second configuration with the second override mechanism in the non-unlocking state.
Figure 8:
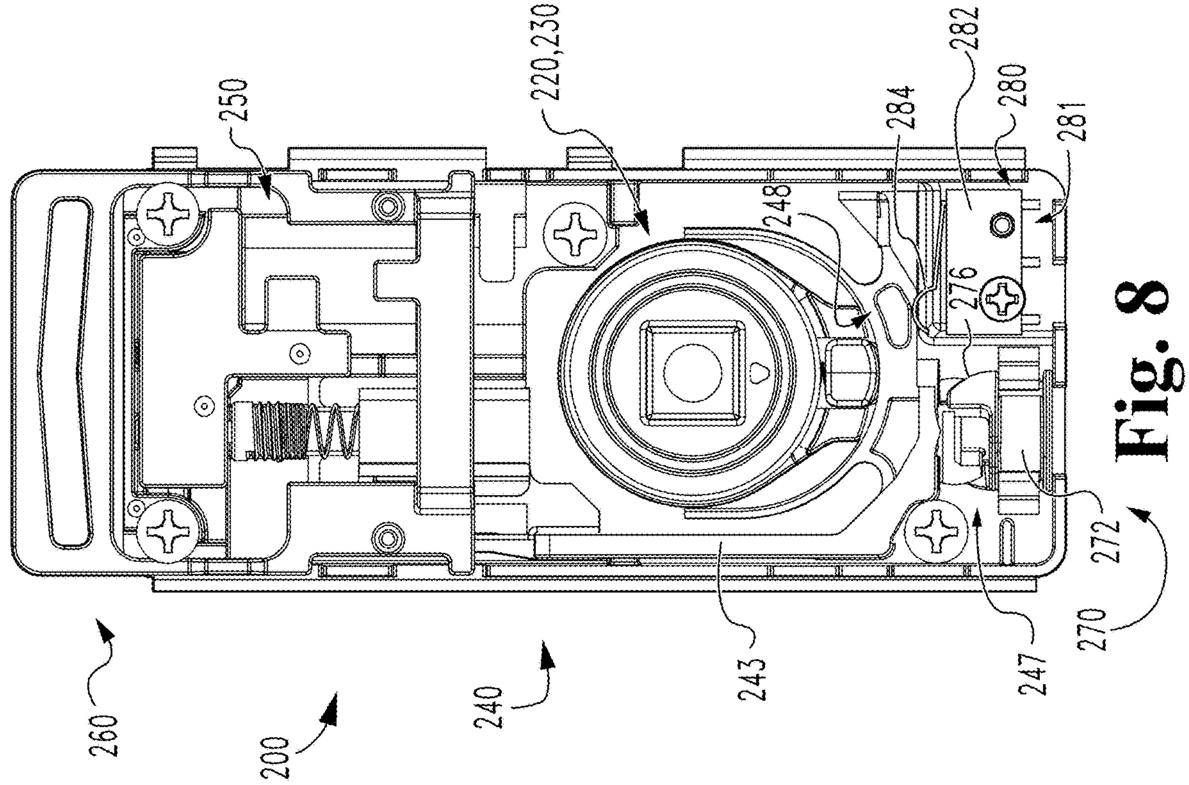
FIG. 8 is a plan view of the lock module in a second configuration with a second override mechanism in a non-unlocking state.

With additional reference to FIGS. 6 and 7, the first override mechanism 260 is operable to unlock the lock module 200, and in the illustrated embodiment is provided in the form of an override plate 262 including a cam slot 264 and a ledge 266. The cam slot 264 is configured to interface with a cam 148 such that rotation of the cam 148 causes the plate 262 to translate between a deactuated position (FIG. 6) and an actuated position (FIG. 7). Translation of the plate 262 from the deactuated position to the actuated position causes the override mechanism 260 to urge the wall 243 toward its unlocked position. More particularly, the ledge 266 of the override mechanism 260 is engaged with the ledge 246 of the wall 243 such that actuating movement of the plate 262 urges the wall 243 toward its unlocking position. Thus, the first override mechanism 260 is operable to unlock the lock module 200 even when the electromechanical drive assembly 250 has not been actuated and/or is under a power failure condition. As described herein, in certain embodiments, the cam 148 is operably connected with a plug 144 of a lock cylinder 140 such that the lock module 200 is capable of being unlocked via actuation of the lock cylinder 140.

Figure 11:
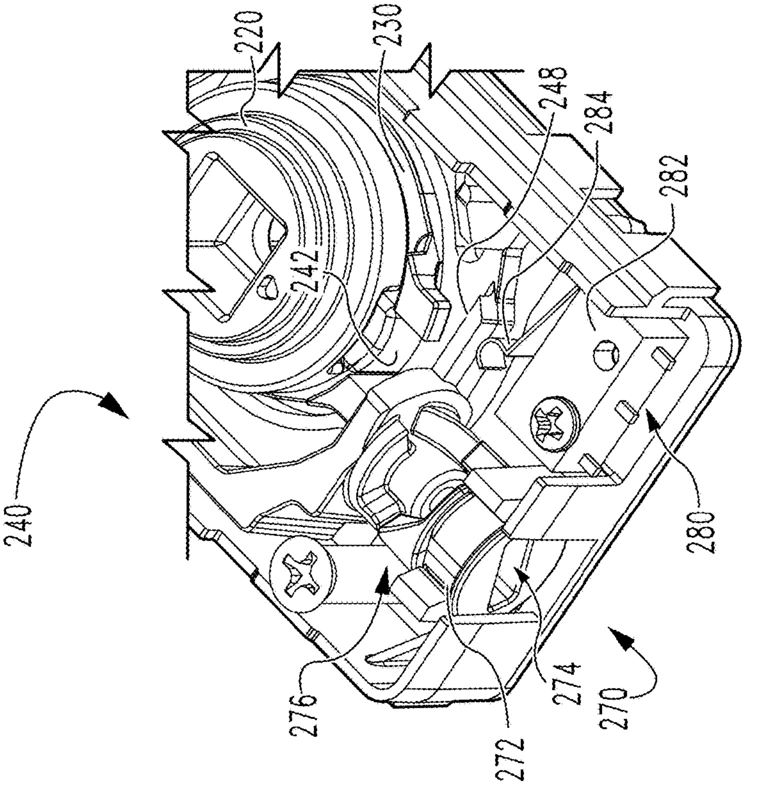
FIG. 11 is a perspective view of the lock module in the second configuration with the second override mechanism in the unlocking state.
Figure 10:
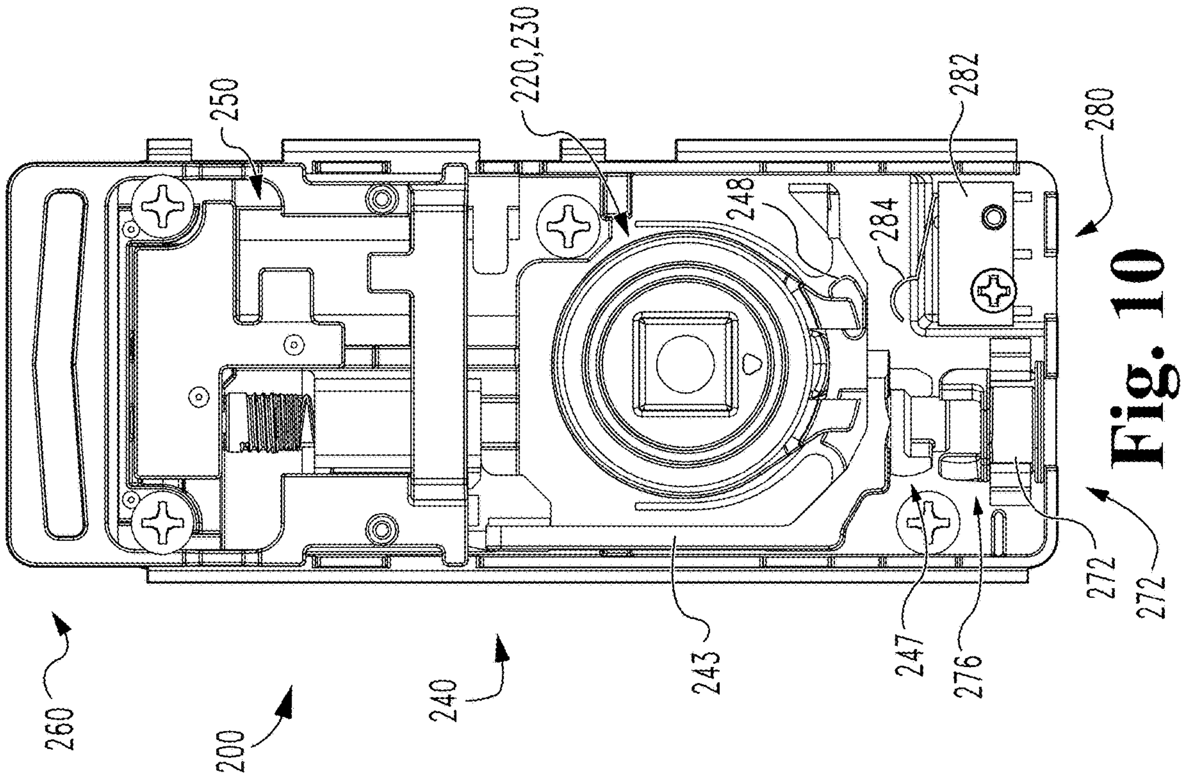
FIG. 10 is a plan view of the lock module in the second configuration with a second override mechanism in an unlocking state.

With additional reference to FIGS. 8-11, the second override mechanism 270 is operable to unlock the lock module 200, and in the illustrated embodiment is provided in the form of an override cam 272 including a receiving slot 274 and a cam interface 276 operable to engage the cam interface 247 of the wall 243. The receiving slot 274 is configured to receive a tailpiece of a lock cylinder such that actuation of the lock cylinder rotates the override cam 272 between a home position (FIGS. 8 and 9) and a rotated position (FIGS. 10 and 11). As described herein, such rotation of the override cam 272 from the home position to the rotated position urges the wall 243 from its locked position to its unlocked position, thereby unlocking the lock module 200.

With the override cam 272 in its home position (FIGS. 8 and 9), the override cam interface 276 permits movement of the wall cam interface 247 such that the wall 243 is free to move between its locked and unlocked positions (e.g., under the urging of the electromechanical drive assembly 250 and/or the first override mechanism 260). Thus, when the override cam 272 is in its home position, the lock module 200 is free to lock and unlock as normal. During rotation of the override cam 272 toward its rotated position, a ramp 277 of the cam interface 276 engages a corresponding ramp of the wall cam interface 247, thereby urging the wall 243 toward its unlocked position and unlocking the lock module 200. Thus, when the override cam 272 is in its rotated position (FIGS. 10 and 11), the lock module 200 is unlocked. The second override mechanism 270 is therefore operable to unlock the lock module 200 even when the electromechanical drive assembly 250 has not been actuated and/or is under a power failure condition.

The lock status sensor 280 is operable to detect the locked/unlocked state of the lock module 200, and in the illustrated form comprises a snap action switch 281 including a body portion 282 and an actuation arm 284. Those skilled in the art will readily recognize that snap action switches such as the switch 281 have a default state (i.e., one of an open state or a closed state) when the arm 284 is in a home position, and a non-default state (i.e., the other of the open state or the closed state) when the arm 284 is in a depressed position. In the illustrated form, the projection 248 of the wall 243 is configured to depress the arm 284 when the wall 243 is in its locking position (FIGS. 8 and 9), and to allow the arm 284 to return to its home position when the wall 243 is in its unlocking position (FIGS. 10 and 11). As a result, the locking/unlocking position of the wall 243 (and thus the locked/unlocked state of the lock module 200) can be determined based upon the default/non-default state of the switch 281.

While the illustrated lock status sensor 280 is provided in the form of a mechanical snap action switch 281, it should be appreciated that the lock status sensor 280 may take another form. As one example, the sensor 280 may be a magnetically-actuated sensor, such as a reed switch or a Hall effect sensor. Moreover, while the illustrated switch 281 is positioned to be in its default state when the lock module 200 is unlocked and to be in its non-default state when the lock module 200 is locked, it should be appreciated that this configuration may be reversed such that the switch 281 is in its default state when the lock module 200 is locked, and is in its non-default state when the lock module 200 is unlocked.

Figure 12:
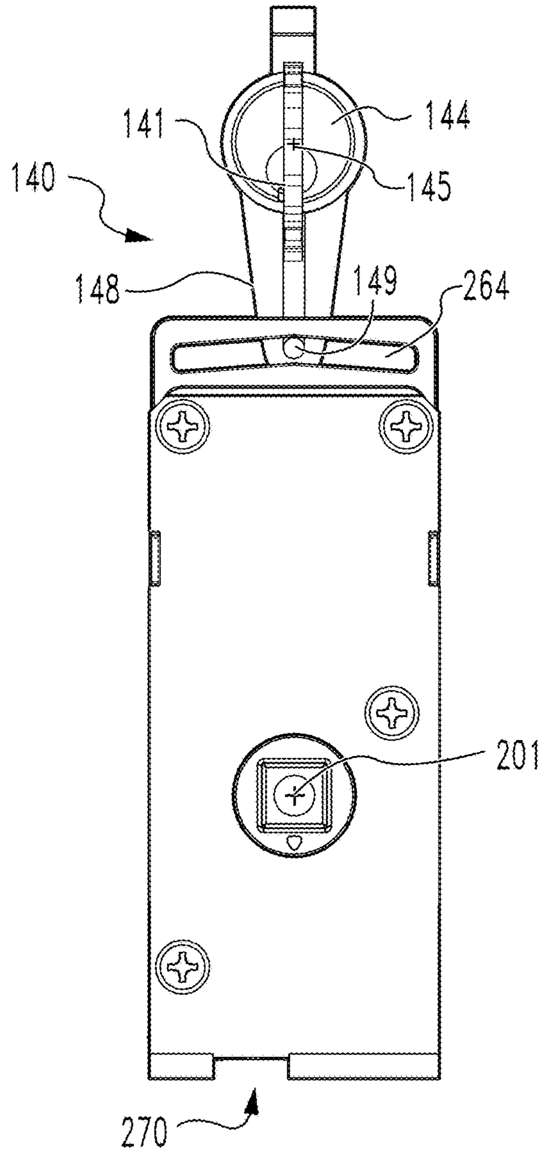
FIG. 12 is a plan view of the lock module in the first configuration.
Figure 13:
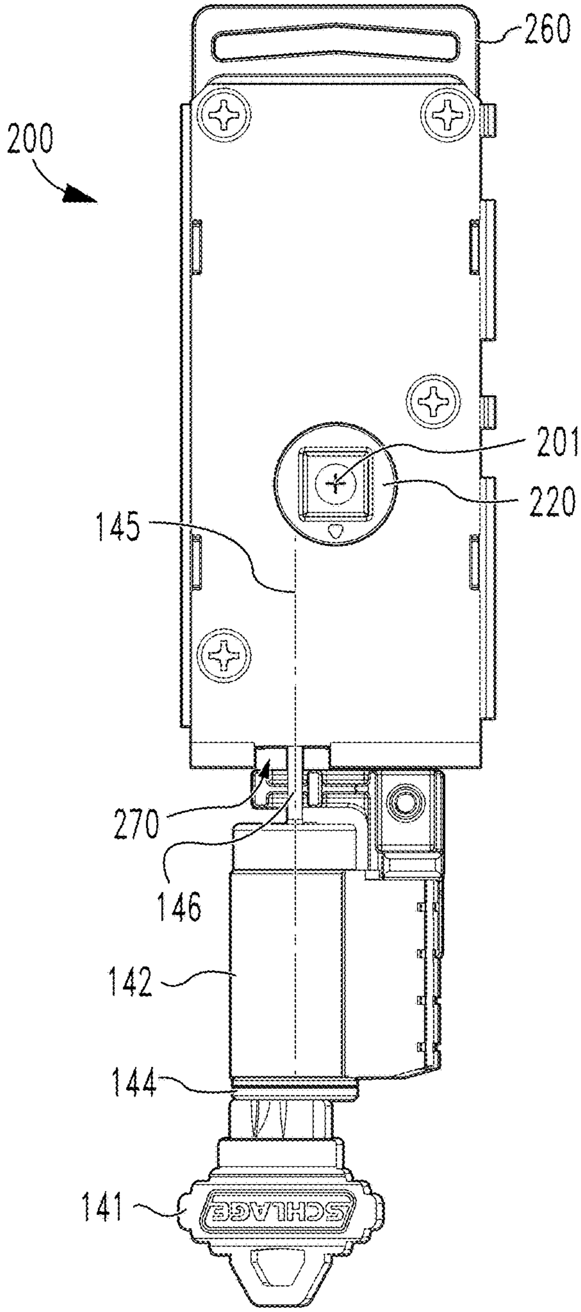
FIG. 13 is a plan view of the lock module in the second configuration.

With additional reference to FIGS. 12 and 13, the lock module 200 is configured for use with a lock cylinder 140, and has a first configuration (FIG. 12) and a second configuration (FIG. 13). The lock cylinder 140 is operable by a key 141, and generally includes a shell 142, a plug 144 mounted in the shell 142 for rotation about a rotational axis 145, and a tumbler assembly operable to selectively prevent rotation of the plug 144 relative to the shell 142. The tumbler assembly is biased toward a blocking position, in which the tumbler assembly prevents rotation of the plug 144 relative to the shell 142. When the proper key 141 is inserted into the plug 144, the tumbler assembly moves to an unblocking position, in which the tumbler assembly does not prevent rotation of the plug 144 relative to the shell 142.

With the lock module 200 in the first configuration (FIG. 12), the plug 144 is operably connected with a cam 148, which includes a post 149 that projects into the cam slot 264 of the first override mechanism 260. Thus, when the lock module 200 is in its first configuration, the lock cylinder 140 is engaged with the first override mechanism 260 such that actuation of the lock cylinder 140 unlocks the clutch mechanism 240 as described above with reference to FIGS. 6 and 7. In the first configuration, the rotational axis 145 of the plug 144 extends longitudinally, or in a direction defined by the longitudinal rotational axis 201 of the hubs 220, 230. In the illustrated form, the rotational axis 145 is parallel to the rotational axis 201 when the lock module 200 is in its first configuration. It is also contemplated that the rotational axes 145, 201 may be askew to one another when the lock module 200 is in its first configuration.

With the lock module 200 in the second configuration (FIG. 13), the plug 144 is operably connected with a tailpiece 146, which extends into the receiving slot 274 of the second override mechanism 270. Thus, when the lock module 200 is in its second configuration, the lock cylinder 140 is engaged with the second override mechanism 270 such that actuation of the lock cylinder 140 unlocks the clutch mechanism 240 as described above with reference to FIGS. 8-11. In the second configuration, the rotational axis 145 of the plug 144 extends in a direction transverse to the longitudinal rotational axis 201 of the hubs 220, 230. In the illustrated form, the rotational axis 145 is perpendicular to the rotational axis 201 when the lock module 200 is in its second configuration. It is also contemplated that the rotational axes 145, 201 may be askew to one another when the lock module 200 is in its second configuration.

As should be evident from the foregoing, the lock module 200 has a first configuration in which the lock cylinder 140 is engaged with the first override mechanism 260, and a second configuration in which the lock cylinder 140 is engaged with the second override mechanism 270. Moreover, the lock cylinder 140 has a different orientation when the lock module 200 is in the first configuration as compared to when the lock module 200 is in the second configuration. More particularly, the rotational axis 145 has a first orientation when the lock module 200 is in the first configuration and a second orientation when the lock module 200 is in the second configuration, and the first orientation and the second orientation of the rotational axis 145 are transverse to one another. Additionally, the lock module 200 is operable to transition between the first configuration and the second configuration without opening the housing 210.

In the illustrated form, the first configuration is one in which a lock cylinder 140 is engaged with the first override mechanism 260 and no lock cylinder is engaged with the second override mechanism 270, and the second configuration is one in which a lock cylinder 140 is engaged with the second override mechanism 270 and no lock cylinder is engaged with the first override mechanism 260. It is also contemplated that the lock module 200 may have an additional or alternative configuration in which a first lock cylinder is engaged with the first override mechanism 260 and a second lock cylinder is engaged with the second override mechanism 270. In such forms, the first lock cylinder and the second lock cylinder may be keyed alike, or may be keyed differently.

Figure 14:
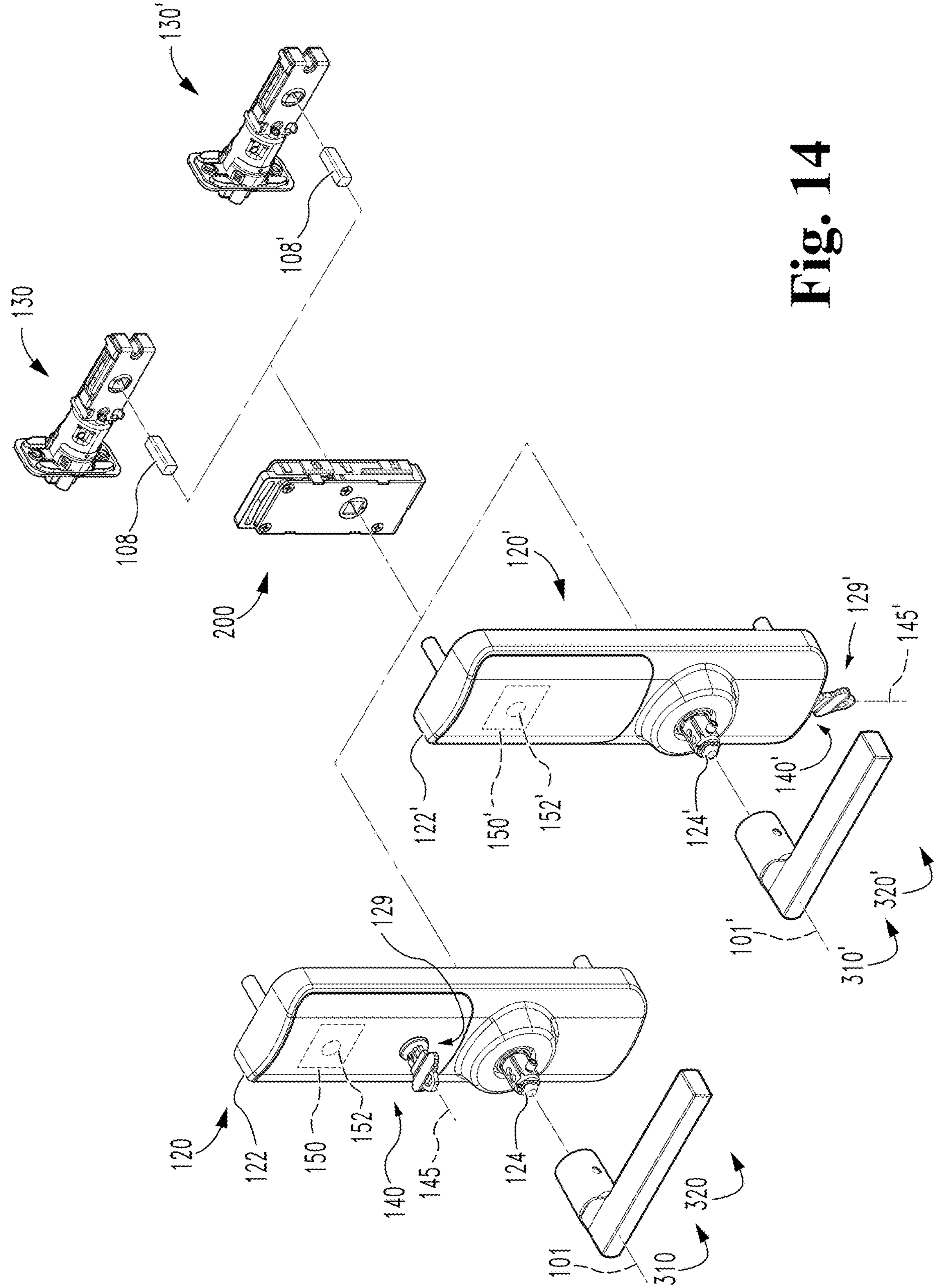
FIG. 14 is an exploded assembly view of a product line according to certain embodiments.

With additional reference to FIG. 14, illustrated therein is a product line 300 according to certain embodiments. The product line 300 generally includes a first assembly 310 and a second assembly 310', each of which is configured for use with the lock module 200. As a result, the product line 300 may be utilized to create each of a first product configuration 320 and a second product configuration 320'. As described herein, the first product configuration 320 includes the lock module 200 and the first assembly 310, and the second product configuration 320' includes the lock module 200 and the second assembly 310'.

In the illustrated embodiment, the first product configuration 320 is provided along the lines of the lockset 100 illustrated in FIG. 1. More particularly, the first product configuration 320 includes the lock module 200 and the first assembly 310, which generally includes a first outside trim assembly 120 and a first latch mechanism 130, and which may further include an inside assembly along the lines of the inside trim assembly 110. The first outside trim assembly 120 includes a first lock cylinder 140 and a first control assembly 150. The first outside trim assembly 120 may further include a cam 148 coupled to a plug 144 of the lock cylinder 140. As described herein, installing the lock module 200 to the first assembly 310 may involve engaging the first spindle 124 with the first hub 220, engaging the first lock cylinder 140 with the first override mechanism 260, and placing the electromechanical drive assembly 250 in communication with the first control assembly 150.

In the illustrated form, the second product configuration 320' is substantially similar to the first product configuration 320, and similar reference characters are used to denote similar elements and features. For example, the second product configuration 320' includes the lock module 200 and the second assembly 310', which generally includes a second outside trim assembly 120' and a second latchbolt mechanism 130', and which may further include a second inside assembly along the lines of the inside trim assembly 110. As with the above-described outside trim assembly 120, the second outside trim assembly 120' includes a second lock cylinder 140' and a second control assembly 150'. As described herein, installing the lock module 200 to the second assembly 310' may involve engaging the second spindle 124' with the first hub 220, engaging the second lock cylinder 140' with the second override mechanism 260, and placing the electromechanical drive assembly 250 in communication with the second control assembly 150'.

As noted above, the illustrated second outside trim assembly 120' is substantially similar to the first outside trim assembly 120. One distinction between the two outside assemblies 120, 120' (and thus between the two assemblies 310, 310' and between the two product configurations 320, 320') is the position and/or orientation of the lock cylinders 140, 140'. The first outside trim assembly 120 includes a first lock cylinder mounting location 129, and the second outside trim assembly 120 includes a second lock cylinder mounting location 129' different from the first lock cylinder mounting location 129. When the first lock cylinder 140 is mounted to the first mounting location 129, the rotational axis 145 of the plug 144 of the first lock cylinder extends longitudinally, or in a direction defined by the longitudinal rotational axis 101 about which the first outside spindle 124 is rotatable. When the second lock cylinder 140' is mounted to the second mounting location 129', the rotational axis 145' of the plug 144' of the second lock cylinder 140' extends in a direction transverse to the longitudinal rotational axis 101' about which the second outside spindle 124' is rotatable.

Figure 15:
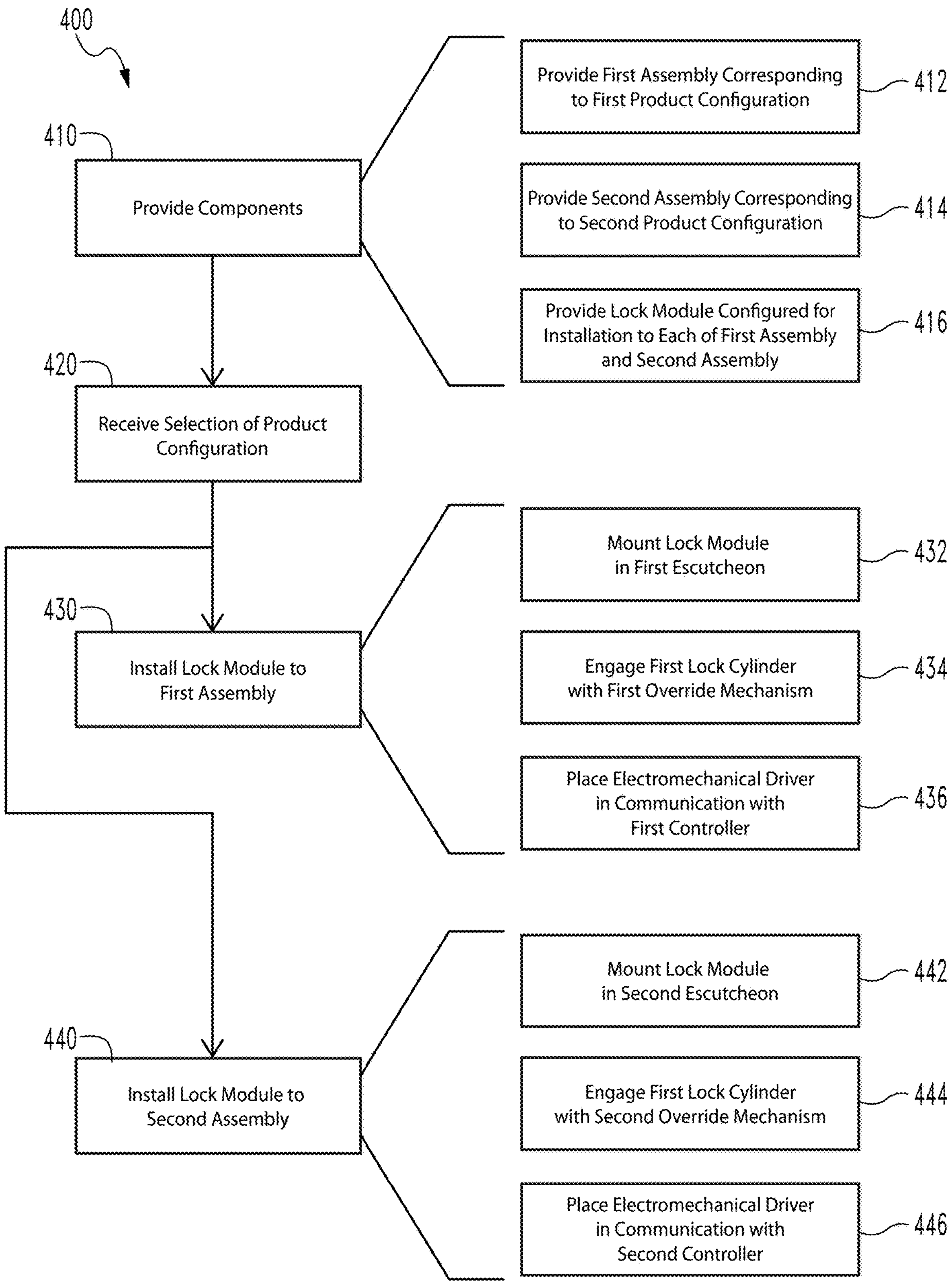
FIG. 15 is a schematic flow diagram of a process according to certain embodiments.

With additional reference to FIG. 15, an exemplary process 400 that may be performed using the product line 300 is illustrated. Blocks illustrated for the processes in the present application are understood to be examples only, and blocks may be combined or divided, and added or removed, as well as re-ordered in whole or in part, unless explicitly stated to the contrary. While the blocks are illustrated in a relatively serial fashion, it is to be understood that two or more of the blocks may be performed concurrently or in parallel with one another. Moreover, while the process 400 is described herein with specific reference to the product line 300 illustrated in FIG. 14, it is to be appreciated that the process 400 may be performed with product lines having additional and/or alternative features.

In certain embodiments, the process 400 may begin with a providing procedure 410. As described herein, the providing procedure 410 may include one or more of providing a first assembly in block 412, providing a second assembly in block 414, and/or providing a lock module in block 416.

The procedure 410 may include block 412, which generally involves providing a first assembly. The first assembly provided in block 412 may include one or more of a first escutcheon, a first spindle rotatable about a first longitudinal axis, a first latchbolt mechanism, a first lock cylinder mounted to a first mounting location and having a first rotational axis, and/or a first control assembly. For example, block 412 may involve providing the first assembly 310 of the product line 300, which generally includes a first escutcheon 122, a first spindle 124 rotatable about a first longitudinal axis 101, a first latch mechanism 130, a first lock cylinder 140 mounted to a first mounting location 129 and having a first rotational axis 145, and/or a first control assembly 150. In the illustrated form, the first rotational axis 145 extends longitudinally in a direction defined by the first longitudinal axis 101.

The procedure 410 may include block 414, which generally involves providing a second assembly. The second assembly provided in block 412 may include one or more of a second escutcheon, a second spindle rotatable about a second longitudinal axis, a second latchbolt mechanism, a second lock cylinder mounted to a second mounting location and having a second rotational axis, and/or a second control assembly. For example, block 414 may involve providing the second assembly 310' of the product line 300, which generally includes a second escutcheon 122', a second spindle 124' rotatable about a second longitudinal axis 101', a second latchbolt mechanism 130', a second lock cylinder 140' mounted to a second mounting location 129' and having a second rotational axis 145', and/or a second control assembly 150'. In the illustrated form, the second rotational axis 145' extends in a direction transverse to the second longitudinal axis 101'. Additionally, when the longitudinal axes 101, 101' are arranged parallel to one another, the rotational axes 145, 145' extend transverse to one another.

The procedure 410 may include block 416, which generally involves providing a lock module configured for installation to each of the first assembly and the second assembly. For example, block 416 may involve providing the lock module 200, which is configured for installation to each of the first assembly 310 and the second assembly 310'. The lock module provided in block 416 may include an electrically-operable driver, a first override mechanism, a second override mechanism, and a lock mechanism operable to be unlocked by each and any of the driver, the first override mechanism, and the second override mechanism. For example, the lock module 200 includes an electromechanical driver 252, a first override mechanism 260, a second override mechanism 270, and a lock mechanism 240 operable to be unlocked by each and any of the electromechanical driver 252, the first override mechanism 260, and the second override mechanism 270.

In certain forms, the electromechanical driver may be configured to urge the lock mechanism toward a locked state in response to a lock signal, and to urge the lock mechanism toward an unlocked state in response to an unlock signal. For example, the electromechanical driver 252 is configured to urge the lock mechanism 240 toward a locked state in response to a lock signal, and to urge the lock mechanism 240 toward an unlocked state in response to an unlock signal. In such forms, one or both of the first control assembly provided in block 412 and/or the second control assembly provided in block 214 may be operable to transmit a lock/unlock signal that selectively comprises the lock signal and the unlock signal. For example, each of the first control assembly 150 and the second control assembly 150' is operable to transmit a lock/unlock signal that selectively comprises the lock signal and the unlock signal.

The process 400 may include a selection procedure 420, which generally involves receiving selection of a product configuration from a plurality of product configurations, the plurality of product configurations comprising a first product configuration and a second product configuration. For example, the selection procedure 420 may involve receiving a user's selection of a selected product configuration from a plurality of product configurations including the first product configuration 320 and the second product configuration 320'. In various forms, block 420 may be performed in person (for example at an assembly center), or may be performed remotely (such as via the internet or another communication network).

The process 400 may include a first assembly procedure 430, which generally involves selectively installing the lock module to the first assembly to thereby create a first product configuration. For example, the procedure 430 may involve installing the lock module 200 to the first assembly 310 to thereby create the first product configuration 320. In certain forms, the first assembly procedure 430 may be performed in response to receiving selection of the first product configuration in block 420.

The first assembly procedure 430 may include block 432, which generally involves installing the lock module to a first escutcheon of the first assembly. For example, block 432 may involve installing the lock module 200 to the first escutcheon 122. The procedure 430 may include block 434, which generally involves engaging a first lock cylinder of the first assembly with a first override mechanism of the lock module. For example, block 434 may involve engaging the first lock cylinder 140 with the first override mechanism 260 by inserting the post 149 of the cam 148 into the cam slot 264 of the override plate 262. The procedure 430 may include block 436, which generally involves placing an electromechanical driver of the lock module in communication with a first controller of the first assembly such that the first controller is operable to transmit a lock/unlock signal to the electromechanical driver. For example, block 436 may involve placing the electromechanical driver 252 in communication with a first controller 152 of the first assembly 310 such that the first controller 152 is operable to transmit a lock/unlock signal to the electromechanical driver 252.

The process 400 may include a second assembly procedure 440, which generally involves selectively installing the lock module to the second assembly to thereby create a second product configuration. For example, the procedure 440 may involve installing the lock module 200 to the second assembly 310' to thereby create the second product configuration 320'. In certain forms, the second assembly procedure 440 may be performed in response to receiving selection of the second product configuration in block 420.

The second assembly procedure 440 may include block 442, which generally involves installing the lock module to a second escutcheon of the second assembly. For example, block 442 may involve installing the lock module 200 to the second escutcheon 122'. The procedure 440 may include block 444, which generally involves engaging a second lock cylinder of the second assembly with a second override mechanism of the lock module. For example, block 444 may involve engaging the second lock cylinder 140' with the second override mechanism 270 by inserting the tailpiece of the second lock cylinder 140' into the receiving slot 274 of the override cam 272. The procedure 440 may include block 446, which generally involves placing the electromechanical driver of the lock module in communication with a second controller of the second assembly such that the second controller is operable to transmit a lock/unlock signal to the electromechanical driver. For example, block 446 may involve placing the electromechanical driver 252 in communication with a second controller 152' of the second assembly 310' such that the second controller 152' is operable to transmit a lock/unlock signal to the electromechanical driver 252.

Figure 16:
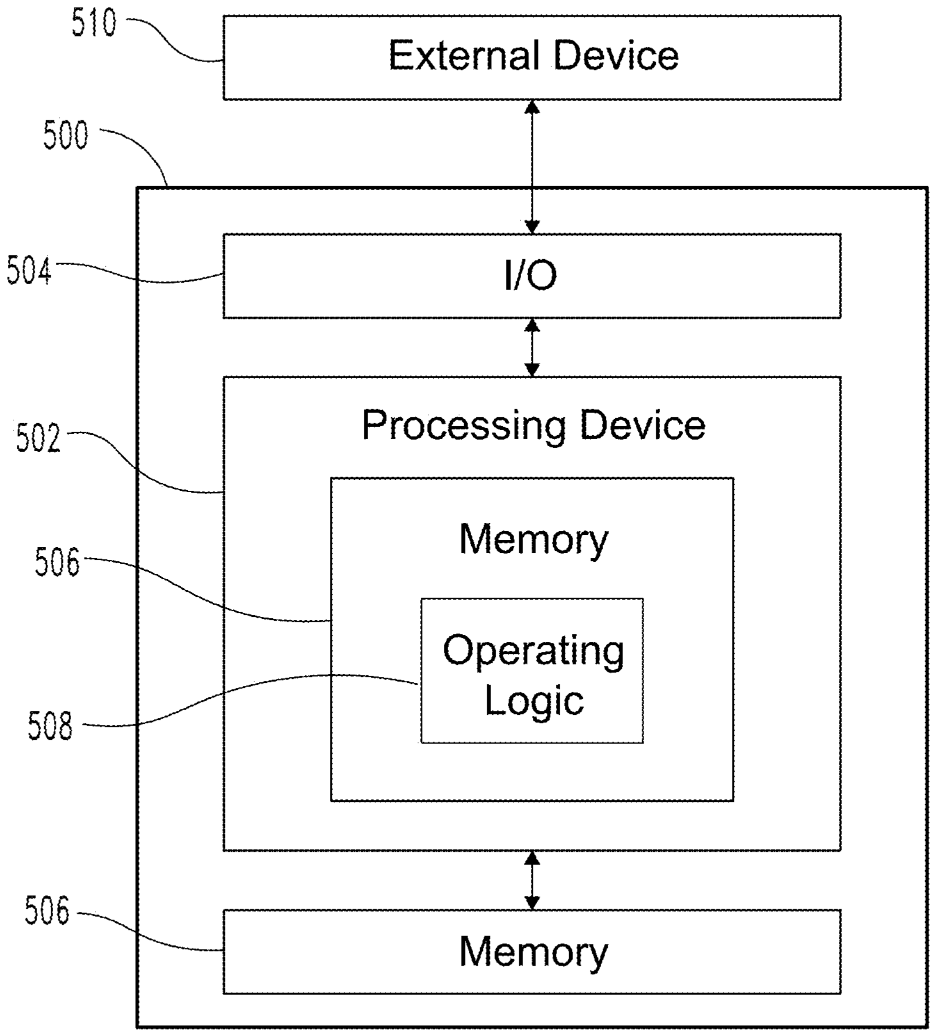
FIG. 16 is a schematic block diagram of a computing device that may be utilized in connection with certain embodiments.

Referring now to FIG. 16, a simplified block diagram of at least one embodiment of a computing device 500 is shown. The illustrative computing device 500 depicts at least one embodiment of a control assembly or controller that may be utilized in connection with the control assemblies 150, 150' and/or controllers 152, 152' illustrated in FIG. 14.

Depending on the particular embodiment, the computing device 500 may be embodied as a server, desktop computer, laptop computer, tablet computer, notebook, netbook, Ultrabook™, mobile computing device, cellular phone, smartphone, wearable computing device, personal digital assistant, Internet of Things (IoT) device, reader device, access control device, control panel, processing system, router, gateway, and/or any other computing, processing, and/or communication device capable of performing the functions described herein.

The computing device 500 includes a processing device 502 that executes algorithms and/or processes data in accordance with operating logic 508, an input/output device 504 that enables communication between the computing device 500 and one or more external devices 510, and memory 506 which stores, for example, data received from the external device 510 via the input/output device 504.

The input/output device 504 allows the computing device 500 to communicate with the external device 510. For example, the input/output device 504 may include a transceiver, a network adapter, a network card, an interface, one or more communication ports (e.g., a USB port, serial port, parallel port, an analog port, a digital port, VGA, DVI, HDMI, Fire Wire, CAT 5, or any other type of communication port or interface), and/or other communication circuitry. Communication circuitry may be configured to use any one or more communication technologies (e.g., wireless or wired communications) and associated protocols (e.g., Ethernet, Bluetooth®, Bluetooth Low Energy (BLE), Wi-Fi®, WiMAX, etc.) to effect such communication depending on the particular computing device 500. The input/output device 504 may include hardware, software, and/or firmware suitable for performing the techniques described herein.

The external device 510 may be any type of device that allows data to be inputted or outputted from the computing device 500. For example, in various embodiments, the external device 510 may be embodied as electromechanical driver 252 and/or the lock status sensor 280. Further, in some embodiments, the external device 510 may be embodied as another computing device, switch, diagnostic tool, controller, printer, display, alarm, peripheral device (e.g., keyboard, mouse, touch screen display, etc.), and/or any other computing, processing, and/or communication device capable of performing the functions described herein. Furthermore, in some embodiments, it should be appreciated that the external device 510 may be integrated into the computing device 500.

The processing device 502 may be embodied as any type of processor(s) capable of performing the functions described herein. In particular, the processing device 502 may be embodied as one or more single or multi-core processors, microcontrollers, or other processor or processing/controlling circuits. For example, in some embodiments, the processing device 502 may include or be embodied as an arithmetic logic unit (ALU), central processing unit (CPU), digital signal processor (DSP), and/or another suitable processor(s). The processing device 502 may be a programmable type, a dedicated hardwired state machine, or a combination thereof. Processing devices 502 with multiple processing units may utilize distributed, pipelined, and/or parallel processing in various embodiments. Further, the processing device 502 may be dedicated to performance of just the operations described herein, or may be utilized in one or more additional applications. In the illustrative embodiment, the processing device 502 is of a programmable variety that executes algorithms and/or processes data in accordance with operating logic 508 as defined by programming instructions (such as software or firmware) stored in memory 506. Additionally or alternatively, the operating logic 508 for processing device 502 may be at least partially defined by hardwired logic or other hardware. Further, the processing device 502 may include one or more components of any type suitable to process the signals received from input/output device 504 or from other components or devices and to provide desired output signals. Such components may include digital circuitry, analog circuitry, or a combination thereof.

The memory 506 may be of one or more types of non-transitory computer-readable media, such as a solid-state memory, electromagnetic memory, optical memory, or a combination thereof. Furthermore, the memory 506 may be volatile and/or nonvolatile and, in some embodiments, some or all of the memory 506 may be of a portable variety, such as a disk, tape, memory stick, cartridge, and/or other suitable portable memory. In operation, the memory 506 may store various data and software used during operation of the computing device 500 such as operating systems, applications, programs, libraries, and drivers. It should be appreciated that the memory 506 may store data that is manipulated by the operating logic 508 of processing device 502, such as, for example, data representative of signals received from and/or sent to the input/output device 504 in addition to or in lieu of storing programming instructions defining operating logic 508. As illustrated, the memory 506 may be included with the processing device 502 and/or coupled to the processing device 502 depending on the particular embodiment. For example, in some embodiments, the processing device 502, the memory 506, and/or other components of the computing device 500 may form a portion of a system-on-a-chip (SoC) and be incorporated on a single integrated circuit chip.

In some embodiments, various components of the computing device 500 (e.g., the processing device 502 and the memory 506) may be communicatively coupled via an input/output subsystem, which may be embodied as circuitry and/or components to facilitate input/output operations with the processing device 502, the memory 506, and other components of the computing device 500. For example, the input/output subsystem may be embodied as, or otherwise include, memory controller hubs, input/output control hubs, firmware devices, communication links (i.e., point-to-point links, bus links, wires, cables, light guides, printed circuit board traces, etc.) and/or other components and subsystems to facilitate the input/output operations.

The computing device 500 may include other or additional components, such as those commonly found in a typical computing device (e.g., various input/output devices and/or other components), in other embodiments. It should be further appreciated that one or more of the components of the computing device 500 described herein may be distributed across multiple computing devices. In other words, the techniques described herein may be employed by a computing system that includes one or more computing devices. Additionally, although only a single processing device 502, I/O device 504, and memory 506 are illustratively shown in FIG. 16, it should be appreciated that a particular computing device 500 may include multiple processing devices 502, I/O devices 504, and/or memories 506 in other embodiments. Further, in some embodiments, more than one external device 510 may be in communication with the computing device 500.

While the invention has been illustrated and described in detail in the drawings and foregoing description, the same is to be considered as illustrative and not restrictive in character, it being understood that only the preferred embodiments have been shown and described and that all changes and modifications that come within the spirit of the inventions are desired to be protected.

It should be understood that while the use of words such as preferable, preferably, preferred or more preferred utilized in the description above indicate that the feature so described may be more desirable, it nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

What is claimed is:

1. A lock module configured for use with each of a first lock cylinder and a second lock cylinder configured the same as or different from the first lock cylinder, the lock module comprising:

a housing;

a lock mechanism movably mounted to the housing;

a first override mechanism movably mounted to the housing and configured for engagement with the first lock cylinder; and a second override mechanism movably mounted to the housing and configured for engagement with the second lock cylinder;

wherein, with the first lock cylinder engaged with the first override mechanism, the first lock cylinder is operable to unlock the lock mechanism via the first override mechanism; and wherein, with the second lock cylinder engaged with the second override mechanism, the second lock cylinder is operable to unlock the lock mechanism via the second override mechanism.

2. The lock module of claim 1, further comprising:

an electrically-operable driver mounted to the housing and operable to unlock the lock mechanism; and a control assembly operable to control the electrically-operable driver to unlock the lock mechanism.

3. The lock module of claim 2, wherein the electrically-operable driver is operable to unlock the lock mechanism independently of the first override mechanism and independently of the second override mechanism.

4. The lock module of claim 1, wherein the lock mechanism is configured to unlock in response to a sliding movement of the first override mechanism along a sliding axis; and wherein the lock mechanism is configured to unlock in response to a rotational movement of the second override mechanism about a rotational axis.

5. The lock module of claim 4, wherein the sliding axis extends in a direction defined by the rotational axis.

6. The lock module of claim 1, wherein, with the first lock cylinder engaged with the first override mechanism, a plug of the first lock cylinder is rotatable about a first rotational axis to thereby actuate the first override mechanism;

wherein, with the second lock cylinder engaged with the second override mechanism, a plug of the second lock cylinder is rotatable about a second rotational axis to thereby actuate the first override mechanism; and wherein the first rotational axis and the second rotational axis are transverse to one another.

7. The lock module of claim 1, further comprising:

a first hub rotatably mounted in the housing;

a second hub rotatably mounted in the housing; and a coupler operable to selectively rotationally couple the first hub and the second hub;

wherein the first hub is operable to rotate relative to the second hub when the lock mechanism is locked; and wherein the first hub and the second hub are rotationally coupled via the coupler when the lock mechanism is unlocked.

8. The lock module of claim 1, wherein the lock module has a first configuration in which the first lock cylinder is engaged with the first override mechanism;

wherein the lock module has a second configuration in which the second lock cylinder is engaged with the second override mechanism; and wherein the lock module is operable to transition between the first configuration and the second configuration without opening the housing.

9. The lock module of claim 1, wherein the housing has a box-shaped geometry.

10. A system, comprising:

a lock module comprising a first override mechanism and a second override mechanism;

a first lock apparatus comprising a first lock cylinder, wherein, with the lock module installed to the first lock apparatus, the first lock cylinder is operable to unlock the lock module via the first override mechanism; and a second lock apparatus comprising a second lock cylinder, wherein, with the lock module installed to the second lock apparatus, the second lock cylinder is operable to unlock the lock module via the second override mechanism.

11. The system of claim 10, wherein each of the first override mechanism and the second override mechanism is independently operable to unlock the lock module.

12. The system of claim 10, wherein the first lock apparatus comprises a first escutcheon in which the lock module is seated when the lock module is installed to the first lock apparatus; and wherein the second lock apparatus comprises a second escutcheon in which the lock module is seated when the lock module is installed to the second lock apparatus.

13. The system of claim 10, wherein the lock module further comprises an electrically-operable driver operable to unlock the lock module.

14. The system of claim 13, wherein the first lock apparatus comprises a first control assembly operable to control the electrically-operable driver when the lock module is installed to the first lock apparatus; and wherein the second lock apparatus comprises a second control assembly operable to control the electrically-operable driver when the lock module is installed to the second lock apparatus.

15. The system of claim 10, wherein a first rotational axis of a first plug of the first lock cylinder extends longitudinally; and wherein a second rotational axis of a second plug of the second lock cylinder extends transverse to the second longitudinal axis.

16. A method of assembling an access control device in a selected configuration, the method comprising:

selecting a lock apparatus based upon the selected configuration, wherein the lock apparatus is selected from:

a first lock apparatus comprising a first lock cylinder; and a second lock apparatus comprising a second lock cylinder; and installing a lock module to the selected lock apparatus, the lock module comprising a first override mechanism and a second override mechanism;

wherein, when the selected lock apparatus is the first lock apparatus, the installing comprises engaging the first lock cylinder with the first override mechanism such that the first lock cylinder is operable to unlock the lock module; and wherein, when the selected lock apparatus is the second lock apparatus, the installing comprises engaging the second lock cylinder with the second override mechanism such that the second lock cylinder is operable to unlock the lock module.

17. The method of claim 16, wherein the lock module further comprises an electrically-operable driver operable to unlock the lock module; and wherein the installing further comprises placing the electrically-operable driver in communication with a control assembly of the selected lock apparatus.

18. The method of claim 16, wherein an orientation of the first lock cylinder relative to the first lock apparatus is different from an orientation of the second lock cylinder relative to the second lock apparatus.

19. The method of claim 16, wherein the first lock cylinder has a horizontal orientation in the first lock apparatus; and wherein the second lock cylinder has a vertical orientation in the second lock apparatus.

20. The method of claim 16, wherein the lock module further comprises a first hub and a second hub;

wherein the first hub is operable to rotate relative to the second hub when the lock module is locked;

wherein the first hub is rotationally coupled with the second hub when the lock module is unlocked; and wherein the installing comprises engaging the first hub with a spindle of the selected lock apparatus, and engaging the second hub with a latch mechanism of the selected lock apparatus.

* * * * *